Oct. 2, 1945.                C. NYGREN                    2,385,838
                         HIGH TEMPERATURE FAN
                       Filed April 21, 1945          9 Sheets-Sheet 1

INVENTOR.
Carl Nygren
BY Mann and Brown
   Att'ys.

Oct. 2, 1945. C. NYGREN 2,385,838
HIGH TEMPERATURE FAN
Filed April 21, 1945 9 Sheets-Sheet 2

INVENTOR.
Carl Nygren
BY Mann and Brown
Attys

Oct. 2, 1945. C. NYGREN 2,385,838
HIGH TEMPERATURE FAN
Filed April 21, 1945 9 Sheets-Sheet 3

Oct. 2, 1945.                    C. NYGREN                    2,385,838
                              HIGH TEMPERATURE FAN
                              Filed April 21, 1945         9 Sheets-Sheet 6

Inventor
Carl Nygren
BY Mann and Brown
Attorneys.

Oct. 2, 1945. C. NYGREN 2,385,838
HIGH TEMPERATURE FAN
Filed April 21, 1945 9 Sheets-Sheet 8

Inventor
Carl Nygren
BY
Mann and Brown
Attorneys.

Oct. 2, 1945.                    C. NYGREN                    2,385,838
                            HIGH TEMPERATURE FAN
                    Filed April 21, 1945        9 Sheets-Sheet 9

Inventor
Carl Nygren
BY
Mann and Brown
Attorneys.

Patented Oct. 2, 1945

2,385,838

UNITED STATES PATENT OFFICE 2,385,838

HIGH TEMPERATURE FAN

Carl Nygren, Michigan City, Ind., assignor to Michiana Products Corporation, Michigan City, Ind., a corporation of Indiana Application April 21, 1945, Serial No. 589,565

5 Claims. (Cl. 230—134)

This invention relates to centrifugal fans or blowers for heat treating furnaces, and has for its principal object to provide an improved arrangement of hub members and blades whereby the latter are securely made fast against outward movement under centrifugal force and against turning movements with respect to the hub that will safely endure the rigorous conditions in service at high speed and high temperatures. Generally speaking, this is accomplished by giving the hub members a wide grasp on enlarged, somewhat delta shaped inner portions of the blades and providing positive fastening means between the hub members and the blades at points equidistant from the axis to preserve dynamic balance.

This application is a continuation in part of Ser. No. 536,801, filed May 22, 1944.

In the accompanying drawings—

These particular forms and the corresponding description are chosen for the purpose of disclosure only and are not intended to impose unnecessary limitations on the claims, for it is fully appreciated that the substance of the invention can be embodied in many other forms.

Figure 1:
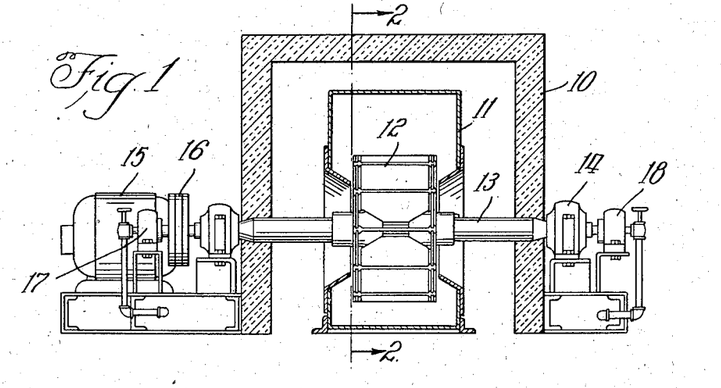
Figs. 1 and 2 are diagrammatic views of a double inlet fan and its associated parts in one form of installation.
Figure 2:
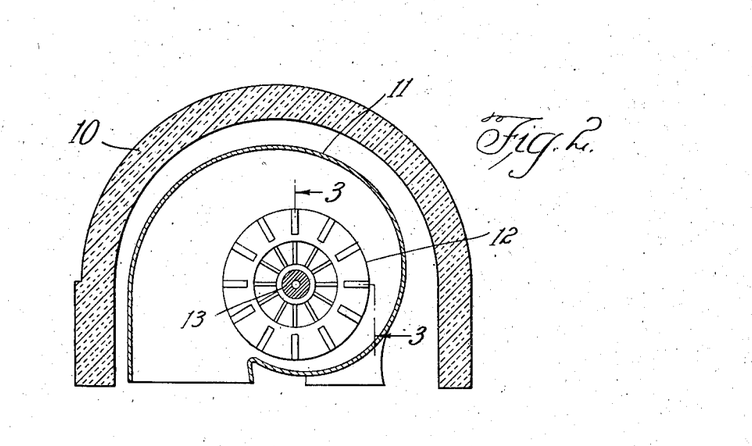

In Figs. 1 and 2, 10 indicates a conventional form of masonry installation for a fan or blower within which is a metal casing 11 for a double inlet fan 12 mounted on a hollow water cooled shaft 13, journaled in bearings 14 and driven by a motor 15 through a V-belt drive 16. The inlet side of a water cooling unit is shown generally at 17, and the return side is shown generally at 18.

Water cooling is ordinarily used in fan constructions for propelling high temperature fluids such as the gases circulated in heat treating furnaces.

The detail of the preferred form of double inlet fan is shown in Figs. 3-7 (Sheets 2 and 3). The fan is composed of twelve blades, generally indicated by 50, two circular shrouds 51, and two hub portions 52, assembled on a hollow shaft 53.

Figure 3:
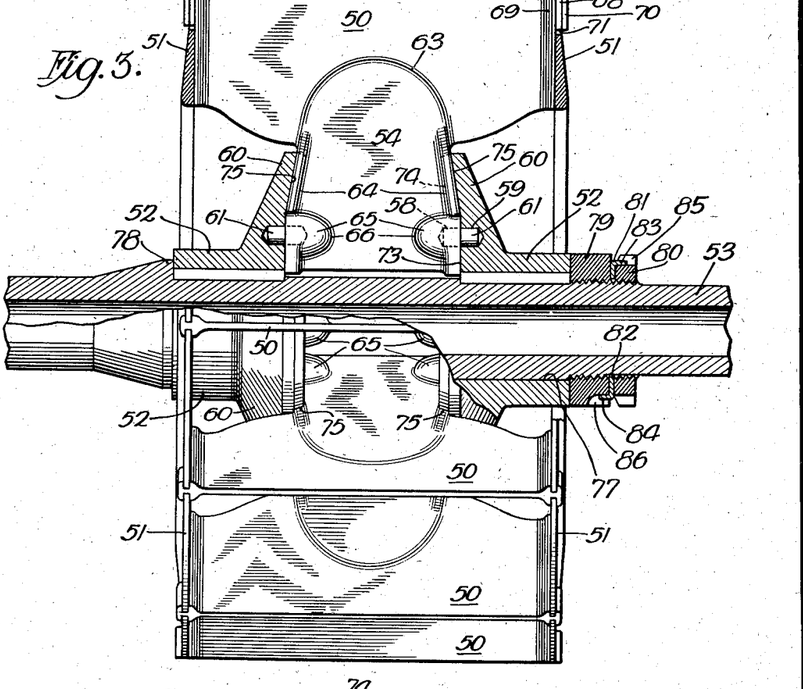
Fig. 3 is a longitudinal sectional view through a fan and hollow shaft of the preferred construction.
Figure 4:
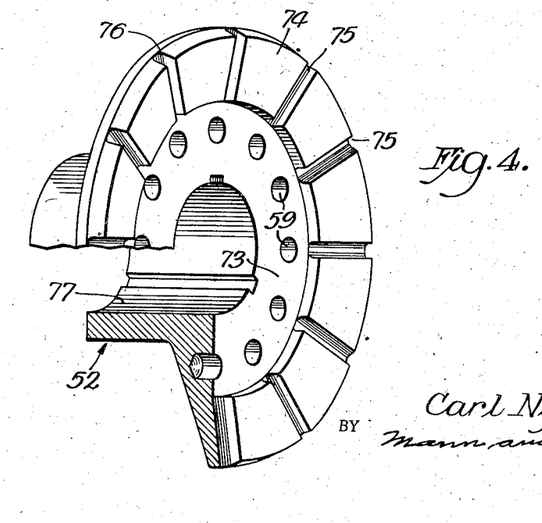
Fig. 4 is a perspective view of one of the hub portions for securing the blades together and to the shaft, as shown in Fig. 3.
Figures 5, 6, 7:
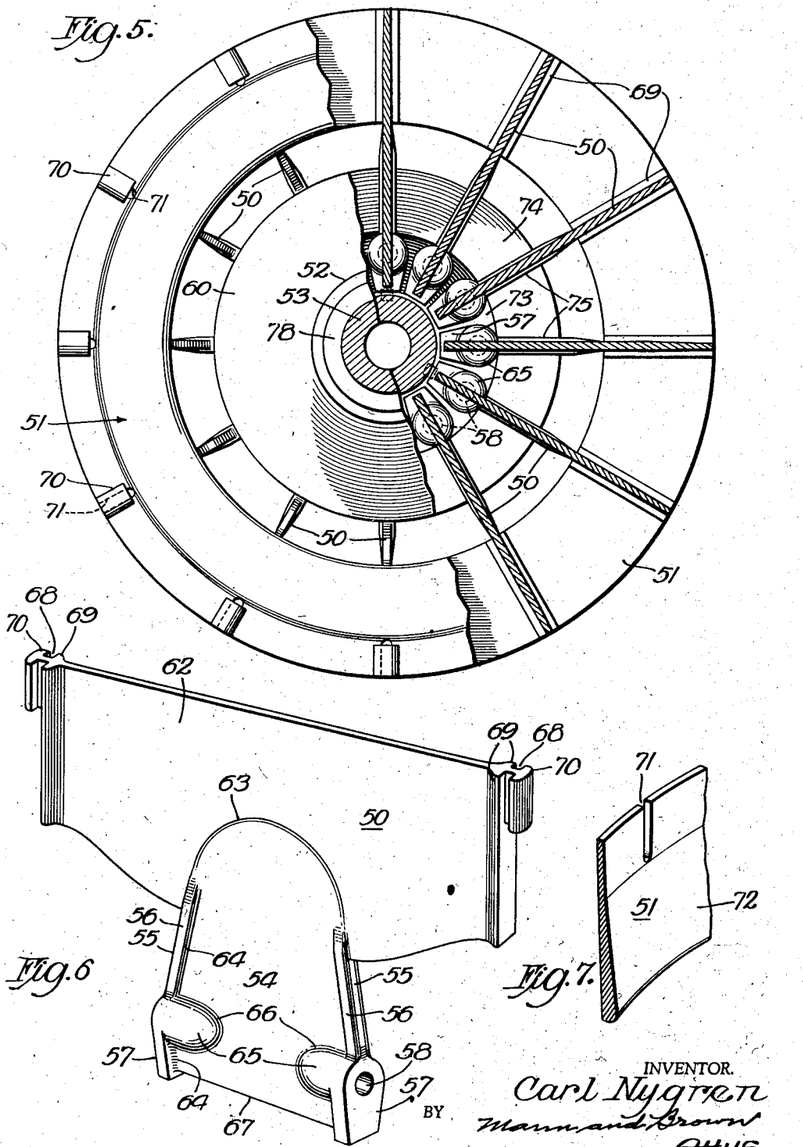
Fig. 5 is a part side elevation and part section taken on the center line transverse to the axis of rotation.
Fig. 6 is a perspective view of one of the blades in the preferred form of construction.
Fig. 7 is a fragment of one form of shroud.
Figures 8, 9, 10, 11:
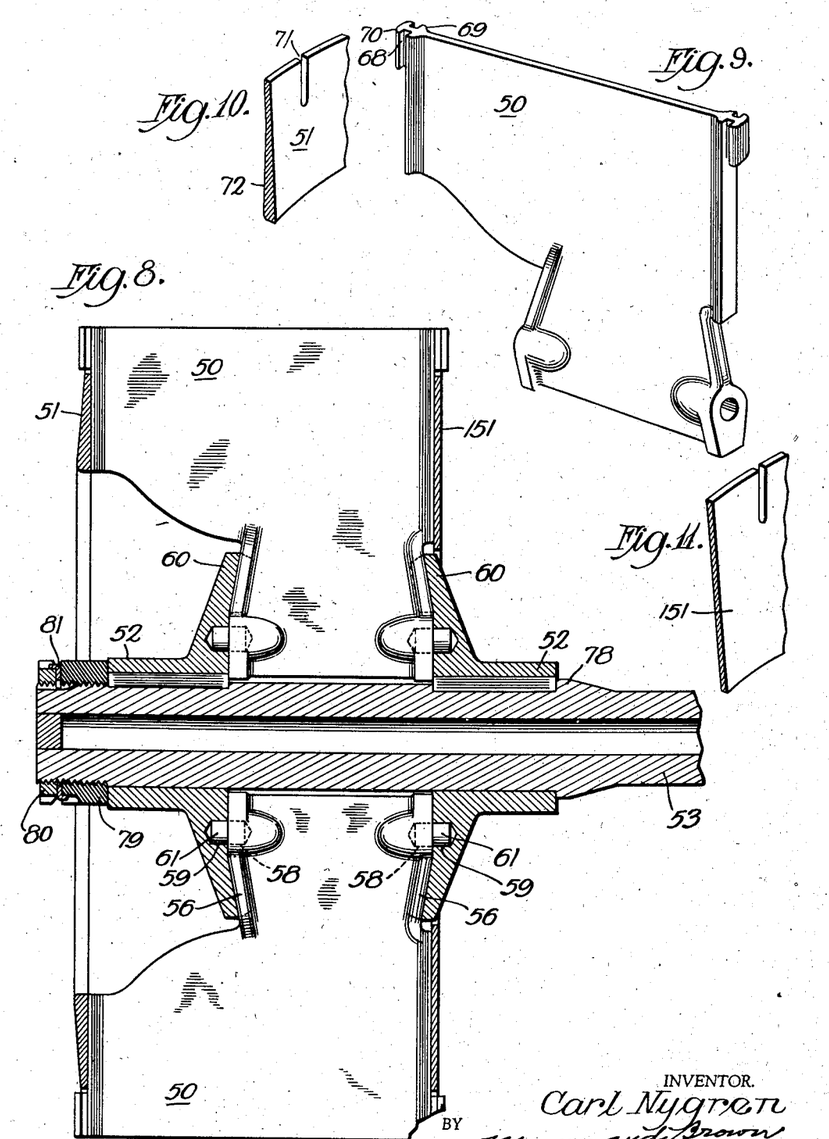
Fig. 8 is a sectional view corresponding to Fig. 3 of a single inlet fan of the preferred construction.
Fig. 9 is a perspective view of one of the blades in a single inlet fan shown in Fig. 8.
Fig. 10 is a fragment of a shroud at the inlet side of the fan.
Fig. 11 is a fragment of the shroud at the opposite side of the fan.

In Figs. 3 and 6, it will be seen that each blade is composed of a generally flat plate having an inner portion or foot 54 provided with outwardly converging side edges 55 by virtue of which it becomes somewhat wedge-shaped or delta-shaped. Each edge 55 is provided with flanges or machining pads 56, which join sector-shaped flanges 57, the twelve of which form a circular group between the hub portions 52, as shown in Figs. 3 and 5. Each sector-shaped flange 57 is provided with an opening 58 aligned with an opening 59 in the adjacent flange 60 on the hub portions 52, and these aligned openings receive fastening dowel pins 61, twenty-four of which positively fasten and hold the blades against outward movement under centrifugal force. Those pins are in circular arrangement about the axis of rotation, and thus in themselves and in the like, or practically identical, blades which they fasten they establish and maintain dynamic balance.

The main body of the inner portion or foot 54 of each blade is thickened relative to the outer portion 62, the inner portion being on the order of 3/8" thick and the outer portion on the order of 1/4" thick. The change in thickness is made very gradual to avoid any abruptness, and avoiding abruptness is the rule throughout this fan construction. And, while no distinct line can be indicated for the change from one thickness to another, the thinner portion of the blade is roughly bounded by the line 63 in Figs. 3 and 6.

The machining pads 56 and the sector-shaped flanges 57 are joined to the inner portions 54 by gently curving fillets 64, generally indicated by shading. In order to provide metal and strength about the inner ends of the openings 58, bosses 65 are provided adjacent to the sector-shaped flanges 57, and they are joined to the thinner inner portions 54 by other gently curving fillets 66. The extreme inner edges 67 of the blades are comparatively straight, and together the twelve of them form a sort of polygon around the shaft 53 but spaced from it, as appears in Figs. 3 and 5. The flanges 57 are slightly longer than the intervening portions 54.

At or adjacent to each side edge, each blade is thickened and provided with grooves 68, whereby at each side of each groove there appear ribs 69 and 70, the ribs 70 being relatively short and the ribs 69 relatively long. The latter are approximately as long as the shrouds are wide at their edges, and the former are about the depth of the slots in the shrouds.

Each shroud 51 is a ring provided with outwardly opening slots 71, twelve in number, to receive the side edges of the several blades as the adjacent portions of the shrouds are received between the ribs 69 and 70. The shrouds are of uniform thickness to about the depth of the slots 71, and from there inwardly they are gradually thickened, as indicated at 72, to provide additional strength for resisting the bursting tendencies of centrifugal force on the shroud as a whole.

An alternative to this construction is shown in copending application Ser. No. 594,750, filed May 19, 1945, and in Figs. 22–26 (Sheets 8 and 9). Others will be readily designed to suit particular conditions and to meet individual preferences.

The flange 60 of each hub portion has an inner flat face 73 for contacting with and bearing against the grouped faces 57 of the blades. Outwardly of this face 73, which is at right angles to the axis, each flange 60 has an inclined face 74 provided with twelve slots 75 to receive and hold the machined faces 56 of the converging edges 55 of the inner portions 54 of the blades. While the slots are backed by a considerable thickness of flange metal, the inner portions are rounded at the corners 76 to avoid any abrupt change of surface that might foster cracks. The fit between the sides of the slots and the machined faces 56 is close and, together with the dowel pins 61, provides a strong driving and holding joint between the hubs and the blades. The adjacent surfaces of the slots 75 and the machined faces 56 being remote from the axis of rotation, minor accumulations of tolerances have less effect than they would if those surfaces were close to the axis. Thus, the construction insures accurate and positive placing and holding of the blades in their relative diverging positions with respect to the hubs in accelerating, driving, and decelerating. This accuracy also contributes to the smooth support of the shrouds 51 on the twelve blades, both in operation and in expanding and contracting.

Each hub portion 52 has a bore 77 to receive a shaft 53 to which it is keyed. The left hub portion 52 in Fig. 3 rests against the shoulder 78 on the shaft, and the right hub portion in Fig. 3 is held against the blades by a large locking collar 79, made fast by a lock nut 80 and a lock washer 81 having one tab 82 fitting in one of the key slots in the shaft 53 and other tabs 83 and 84 bent into the respective notches 85 and 86 in the lock nut 80 and the locking collar 79. In initial assembly, the collar 79 is set up wrench tight and then backed off enough to provide for expansion, which can be initially determined by calculations and corrected by empirical data.

The fan shaft is water cooled and is made of carbon steel. The hub portions 52 are of suitable alloy. The shaft and the hubs, therefore, have different coefficients of expansion. The tendency thus created to increase the clearance between the hub portions and the shaft as the fan is heated up is greatly augmented by the fact that the shaft is water cooled and the hubs are not. Bearing in mind that all of the fan is carried by the hubs on the shaft and that a 30-inch fan, substantially as shown in Figs. 3–6, will weigh on the order of 650 pounds, it is apparent that a slight eccentricity between the hub portions and the shaft results in enormous forces due to lack of dynamic balance.

To prevent this condition and to obtain and maintain dynamic balance, three or more keys or splines are used to effect a driving connection between the shaft and the hub portions. In Figs. 3 and 5, keys are shown, and they will probably be most used, and preferably the keyways and keys will be machined to give contact at the side faces only, the outer faces being free radially. In this instance, the three keys are arranged at 120 degrees on centers, and are shown as the simplest form. Four keys arranged at 90 degrees on centers, etc., are contemplated. Three keys is the smallest number that will fairly insure and maintain dynamic balance.

As heretofore made in a 30-inch fan, the outer portions of the shrouds were .245 inch thick with an allowance of plus or minus .003, and the grooves 68 were .250 inch with an allowance of plus .003 minus .000. The inner edges of the shrouds were 1/2 inch thick, and the corners were rounded on a 1/4 inch radius.

The slots 75 in the flanges 60 of the hub portions were 1/2 inch wide plus .005 minus .000, and the inclined edges 55 at the machined faces 56 were .498 inch thick plus .002 minus .000. The sector-shaped flanges 57 were 23° 26'. The openings 58 were 1 inch in diameter reamed plus .000 minus .002. The openings 59 in the flange 60 were the same, and all the openings were arranged on circles of an 8 inch diameter. The machined faces 56 extended to approximately 8½ inches from the axis of rotation and were about ½ inch wide. The side faces of the sector-shaped flanges 57 were about ¾ of an inch wide.

The outer surface of the flange 60 on the hub portion was about 70° 28' inclined to the vertical, and the inner face of the same flange was about 60° to the vertical. The inside diameter of the shrouds was 20 inches. There were thus provided ample inlet openings at each side somewhat in excess of the discharge opening at the perimeter of the fan.

The slots 71 in the shrouds were 1⅝ inches deep, or about ⅓ of the 5-inch radial width of the shrouds.

Adjacent sector-shaped flanges 57 are spaced by an angle 6° 34'.

These and other clearances and dimensions are given to insure complete disclosure for one size of fan that has been satisfactory in actual service, but they are not intended to impose any limitations on the claims.

According to one mode of assembly, the inner hub portion is in place on the shaft against the shoulder 78. The blades are assembled with the two shrouds and brought into position with the pins projecting from the hub flange 60 into the openings in the blades. The other hub flange is then brought into place; the collar 79 is threaded on; the lock washer slipped into place; the lock nut screwed up; and the tabs 83 and 84 bent over.

Figures 12, 13, 14:
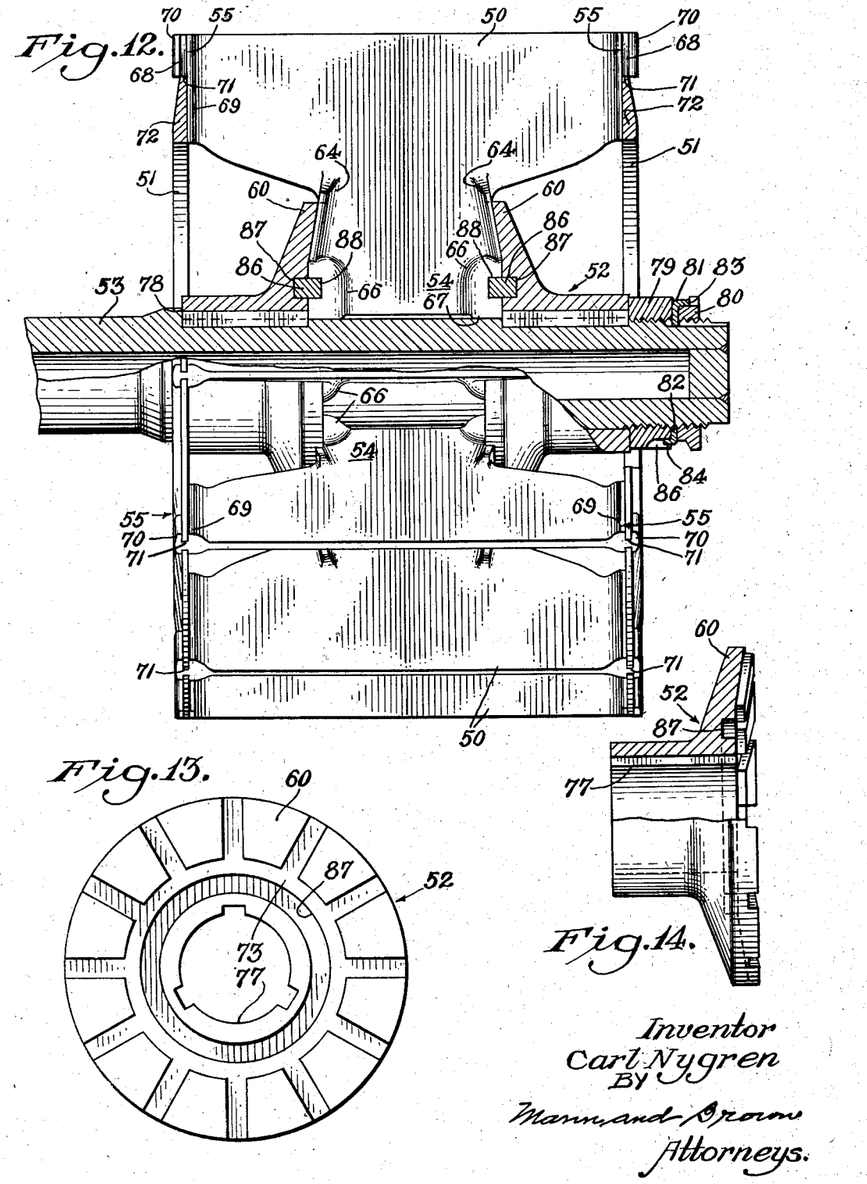
Fig. 12 is a longitudinal section through a fan and hollow shaft corresponding to Fig. 3 except for a different means to cross fasten the blades to the hub members.
Fig. 13 is a face view of one of the hub members used in the fan shown in Fig. 12.
Fig. 14 is a half longitudinal section through the hub member shown in Fig. 13.
Figures 15, 16, 17, 18:
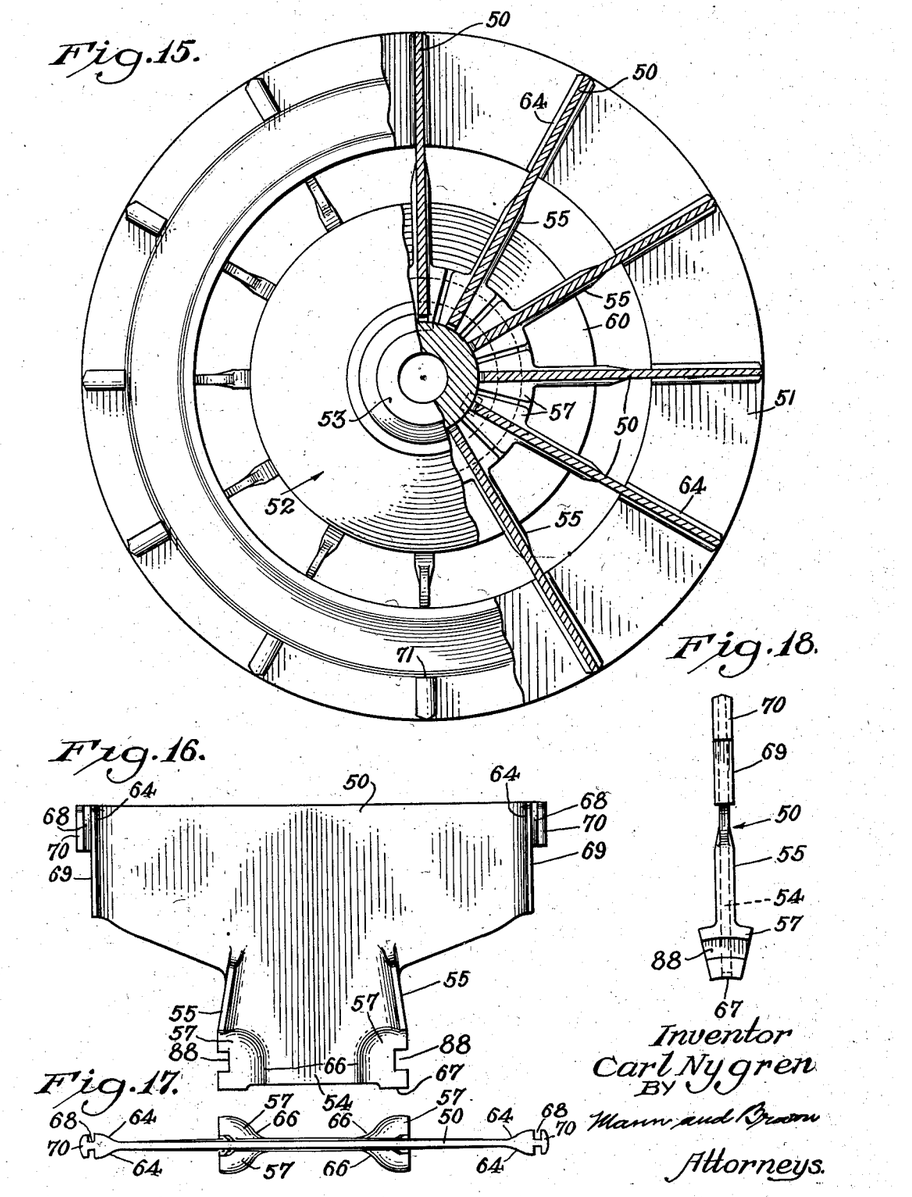
Fig. 15 is a part side elevation and part section taken on the center line transverse to the axis in Fig. 12.
Fig. 16 is a front elevation of one of the blades used in Fig. 15.
Fig. 17 is an end view of that blade looking from the top in Fig. 16.
Fig. 18 is an edge view of that blade looking from the right in Fig. 16.

A single inlet fan embodying the characteristics of the double inlet fan shown in Figs. 3–7 is shown in Figs. 8–11 (sheet 4). It corresponds to the double inlet fan in every particular except that the blades are cut away at the right, as shown best by comparing Figs. 3 and 8, and the shroud 151 at the right is wide enough to close the right side of the fan, leaving the entire inlet at the left. Hence, in view of the detailed description that has been given with respect to the double inlet fan, it will be sufficient to add the corresponding numerals to Figs. 8–11. Instead of using dowel pins 61, shown in Figs. 3, 5, and 8, some will prefer to cross-fasten the blades 50 to the hub portions 52 by rings 86, as shown in Fig. 12, fitted into circular grooves 87 in the hub flanges 60 and circular notches 88 in the blades as shown in Figs. 12 and 16. By this construction, it will be necessary to seat the blades in a fixture for machining with notches 88, but the assembly is somewhat simplified.

Figure 19:
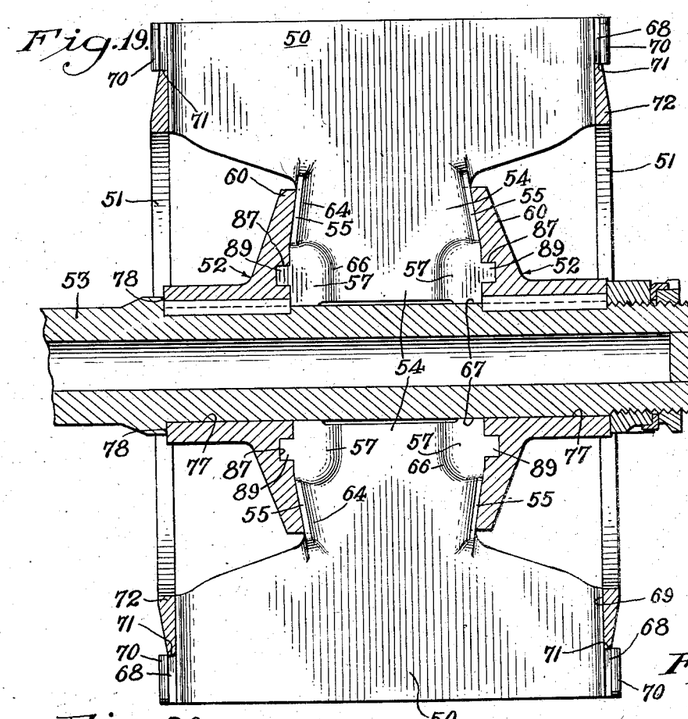
Fig. 19 is a longitudinal section through another double entry fan corresponding to Fig. 3, but showing still a different means for cross fastening the blades to the hub members.
Figure 20:
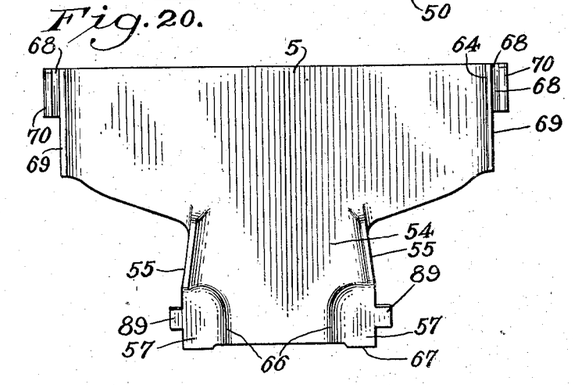
Fig. 20 is a front elevation of one of the blades used in the fan in Fig. 19.
Figure 21:
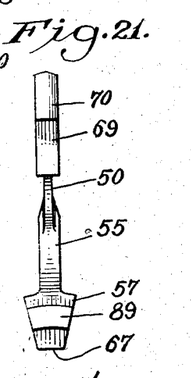
Fig. 21 is an edge view of the blades shown in Fig. 20 looking from the right in that figure.
Figure 22:
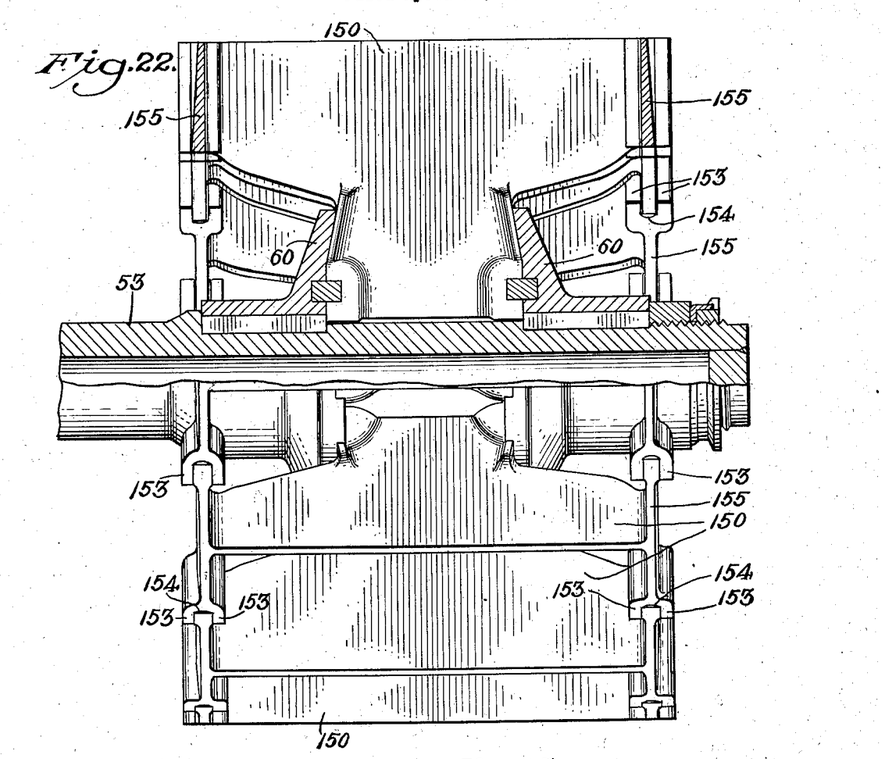
Fig. 22 is a longitudinal section through another fan similar to Fig. 3 but showing a different form and construction of shroud.
Figure 23:
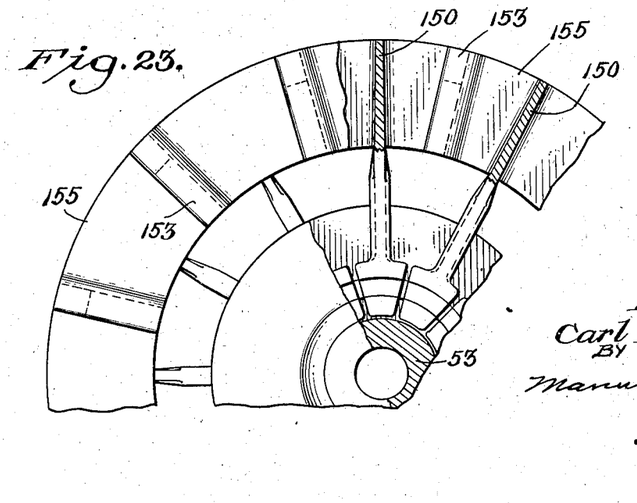
Fig. 23 is a part section and part elevation of the fan shown in Fig. 22.
Figures 24, 25:
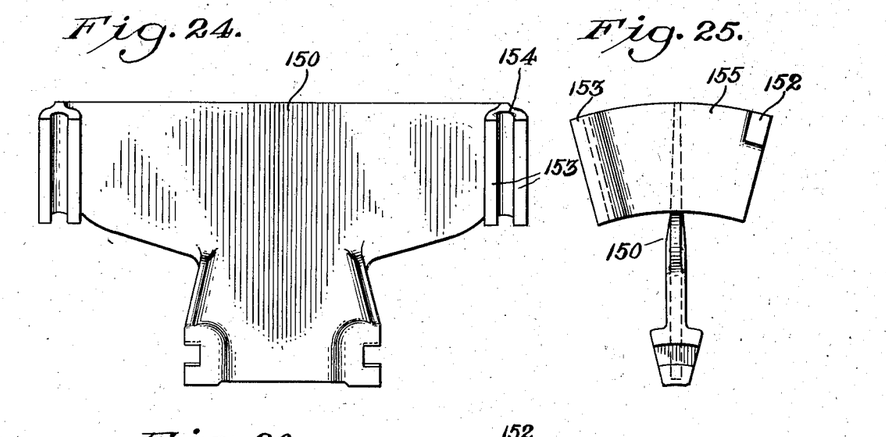
Fig. 24 is a front elevation of one of the blades used in the fan in Fig. 22.
Fig. 25 is an edge view of the blades shown in Fig. 24 looking from the right in that figure.
Figure 26:
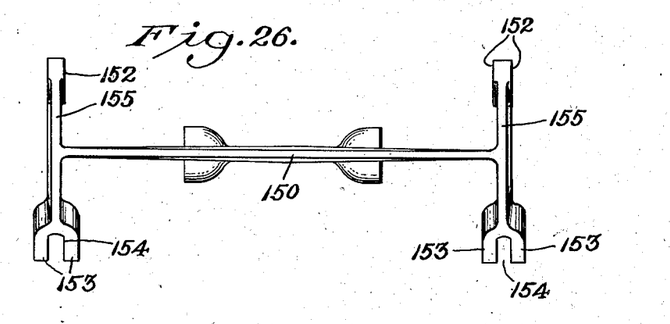
Fig. 26 is an end view of the blades shown in Fig. 24 looking downwardly on that figure.

A further alternative is shown in Figs. 19, 20, and 21 (Sheet 7), wherein, instead of a separate ring 86, blades 50 are provided with integral lugs 89 entering grooves 87 in the flanges 60 of the hub members to effect the cross fastening. A reverse of this will be preferred by some, as illustrated in Figs. 19 and 20 of application Ser. No. 536,801, filed May 22, 1944.

These variations are deemed sufficient to illustrate how designers and production men will vary the forms while maintaining the fundamental scheme of giving the hub members a wide grasp on the inner, delta-shaped portions of the blades on the faces 55 and 56 and supplementing this by positive cross fastening between the inner portions of the blades and the hub members in circular arrangement to determine the exact relation between the several blades and the hub members and maintain that relation in service.

According to the preferred construction, the hub portions and blades and the shrouds are cast from suitable alloys and machined to make the blades and the two shrouds and the two hub portions, respectively, identical. After the machining, the parts should be annealed at a temperature above the highest to be expected in service in order to remove internal strains that might be released in service and throw the fan out of balance. By weighing the blades and a slight amount of fitting, the assembly can be readily given dynamic balance, and the construction described will insure maintenance of that balance in service as well as the necessary strength for a long period of service.

The purpose of the pins or rings is to cross-fasten the blades in the hubs, making them secure at the same distance from the axis of rotation—in other words, to establish a datum line or datum lines at which each of the blades is fastened and held against outward individual movement due to centrifugal force.

Another purpose of making the inner portions of the blades wedge-shaped and the hubs to correspond is to give the hubs a grip on the blades to a great distance from the axis of rotation as an element of safety against a blade or a portion of a blade getting free on account of a break across and between the fastening pins or rings.

The inclination of the hub flanges provides the necessary inlet or intake and gives an intake area in excess of the discharge of the perimeter of the fan in the constructions here illustrated.

Each slot 71 in the shrouds 72 is ⅜ of an inch wide, and the bottom is formed by a ⅜ inch drill before the slotting. It is 1⅝ inches deep, and receives the corresponding portion of the blade between the ribs 69 and 70, where it is 1½ inches wide. This portion is also ⅜ of an inch thick, only unavoidable manufacturing clearance being allowed.

Bearing in mind that the machined faces 56 on the inner portions of the blades are firmly and accurately held in place in the slots 75 of the hub flanges 60 to a diameter of 15 inches in a 30-inch fan, it will be apparent that the shrouds are borne upon and driven by 12 blades accurately positioned in the open ended slots 71. Being thus borne and driven without any actual attachment to the blades, they are not only free to expand and contract independently of the blades but in effect they float in rotation subject only to centrifugal force.

Figs. 22–26 illustrate the basic hub and inner blade construction in connection with shrouds formed in sector-shaped pieces individual to the blades. Each blade 150 in this modification has a sector-shaped shroud element 155 provided with machined faces 152 adapted to make a push joint between the flanges 153 of the fork 154 at the adjacent edge of the sector-shaped shroud element carried by the next blade. This and other variations are more fully disclosed in copending application Ser. No. 594,750, filed May 19, 1945, where that subject matter is made the basis of claims.

I claim:

1. In a high temperature centrifugal fan, a plurality of blades in circular arrangement about a common axis of rotation with their outer portions diverging outwardly from said axis and their inner portions converging inwardly toward said axis and terminating in feet which are axially narrower than the blades, said feet lying in the plane of said axis and having edges diverging inwardly in an axial direction, and hub members having peripheral flanges diverging inwardly in an axial direction and grasping said edges of the feet.

2. In a high temperature centrifugal fan, a plurality of blades in circular arrangement about a common axis of rotation with their outer portions diverging outwardly from said axis and their inner portions converging inwardly toward said axis and terminating in feet which are axially narrower than the blades, said feet lying in the plane of said axis and having edges diverging inwardly in an axial direction, and hub members having peripheral flanges provided with grooves diverging inwardly in an axial direction receiving said edges of the feet.

3. In a high temperature centrifugal fan, a plurality of blades in circular arrangement about a common axis of rotation with their outer portions diverging outwardly from said axis and their inner portions converging inwardly toward said axis and terminating in feet which are axially narrower than the blades, said feet lying in the plane of said axis and having portions provided with thickened edges diverging inwardly in an axial direction, and hub members having peripheral flanges provided with grooves diverging inwardly in an axial direction receiving the thickened portions of the edges of the feet.

4. In a high temperature centrifugal fan, a plurality of blades in circular arrangement about a common axis of rotation with their outer portions diverging outwardly from said axis and their inner portions converging inwardly toward said axis and terminating in feet which are axially narrower than the blades, said feet lying in the plane of said axis and having edges diverging inwardly in an axial direction, and a pair of hub members having peripheral flanges diverging inwardly in an axial direction and grasping the adjacent edges of said feet, said flanges terminating peripherally inwardly of the blades and being spaced therefrom to provide an intake for the fan.

5. In a high temperature centrifugal fan, a plurality of blades in circular arrangement about a common axis of rotation with their outer portions converging inwardly toward said axis and terminating in feet which are axially narrower than the blades, said feet lying in the plane of said axis and having edges diverging inwardly in an axial direction, a pair of hub members having peripheral flanges the outer portions of which diverge inwardly in an axial direction and grasp the adjacent edges of said feet, and axially extending cross fastening means interlocking the hub flanges and the feet and establishing a datum line at which each of the feet is fastened and held against outward movement due to centrifugal force.

CARL NYGREN.